United States Patent

Holland et al.

[11] Patent Number: 4,533,387
[45] Date of Patent: Aug. 6, 1985

[54] CHEMICAL PROCESS FOR PRODUCING ALKALI AND ALKALINE EARTH METALS

[75] Inventors: Gerhard Holland, Bernusstr. 7, D-6000 Frankfurt am Main 90; Rudolf Nowak, Frankfurt am Main, both of Fed. Rep. of Germany

[73] Assignee: Gerhard Holland, Frankfurt am Main, Fed. Rep. of Germany

[21] Appl. No.: 531,402

[22] Filed: Sep. 12, 1983

[51] Int. Cl.³ ............................................. C22B 26/00
[52] U.S. Cl. ........................................ 75/66; 75/67 R
[58] Field of Search .............. 75/66, 67 R; 420/400, 420/401, 402, 415, 590

[56] References Cited

U.S. PATENT DOCUMENTS 4,049,443 9/1977 Hatterer et al. ..................... 75/66

Primary Examiner—Melvyn J. Andrews
Attorney, Agent, or Firm—Fisher, Christen & Sabol

[57] ABSTRACT

Halides of alkali and alkaline earth metals ("metals") are reduced with gallium, indium or thallium ("reducing metals") at temperatures below their boiling points at vapor pressures at which the gaseous monohalides of the reducing metals are formed. The quantity of the reducing metals is chosen such that it is sufficient both for the reduction of the metal halides and for the simultaneous solution of the metals formed, e.g.:

$$MgCl_2(s) + 2Ga(l) = \overline{Mg}(l) + 2GaCl(g); 900° K., 0.02 \text{ torr}.$$

The metal is distilled off from the melt formed and is condensed the metal-free reducing metal is recycled for the reduction of the metal halide.

The reducing metal is recovered from the monohalide for re-utilization in the halide reduction; this is effected by reduction of its oxide which is formed either by oxidation of the monohalide, or by oxidation of the trihalide resulting in the disproportionation of the monohalide in addition to elemental reducing metal.

The continuous process design, the loss-free recycling of the reducing metal, the utilization of the heat of exothermal processes, and a minimum consumption of electric power permit a high profitability of producing alkali and alkaline earth metals according to the invention.

7 Claims, 3 Drawing Figures

CHEMICAL PROCESS FOR PRODUCING ALKALI AND ALKALINE EARTH METALS

BACKGROUND OF THE INVENTION

1. Field of the Invention

The invention relates to a purely chemical process for producing alkali and alkaline earth metals by reducing their halides with Ga, In or Tl.

2. Prior Art

The halides of Na, K and Mg are available from abundant natural sources. In addition, they are formed in substantial quantities as reaction products of chemical and halide metallurgical processes. Since alkali and alkaline earth metals can moreover be obtained without difficulty from minerals, rocks and ores, numerous chemical processes for producing alkali and alkaline earth metals from their halides have already been proposed, e.g. the reduction of the fluorides and chlorides of Li, Na, K, Cs, and Rb with Ca, $CaC_2$, and Ba as well as the reduction of $BeF_2$ and $BeCl_2$ with Mg or Na; but these reducing agents have to be generated beforehand, preferably by fusion electrolysis.

Those processes have the disadvantage that the required reducing agents Ca, Ba, Mg, and $CaC_2$ have to be produced with an uneconomically high consumption of electric power. For example, the separation of merely 1 t magnesium from magnesium chloride by fusion electrolysis requires at least 17,000 kWh, and for the production of 1 t sodium 1.4 t calcium carbide from CaO and C is required at an electric power consumption of 4,200 kWh, apart from the poor spacetime yield of electrolytic plants and the voluminous electrical equipment needed for the generation and conduction of high-ampere current, this applies also to the calcium carbide furnaces.

BROAD DESCRIPTION OF THE INVENTION

The invention, therefore, is aimed at a process for chemically producing or recovering alkali and alkaline earth metals from their halides using reducing agents whose resulting halides can likewise be regenerated chemically to the original reducing agents so that the consumption of electric power is kept at a minimum—electricity is required merely for conveyance.

It has been found that alkali and alkaline earth metals can be produced in a most economical and moreover optimum technological manner by starting from their halides and using gallium, indium, or thallium as reducing agent and at the same time solvent those monohalides thus formed can readily be regenerated by chemical processes to the respective elements.

In the following the principle of the process according to the invention is explained on the basis of the generation of magnesium from magnesium chloride using gallium as reducing agent and solvent (FIG. 1); according to international usage the following denotations have been used:

$\overline{Mg}(l)$: dissolved magnesium in liquid phase
(s): solid
(l): liquid
(g): gaseous.

In the halide reduction chamber I, at a temperature of 1,300° K. liquid pure $MgCl_2$ is reduced with an excess of liquid Ga to give Mg which, in statu nascendi, is simultaneously dissolved in the excess of Ga.

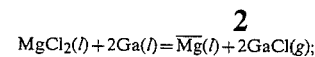

$$MgCl_2(l)+2Ga(l)=\overline{Mg}(l)+2GaCl(g);$$

The result is, on the one hand, Ga—Mg melt (solution) and GaCl vapour, on the other.

In the fractionation chamber II Mg is distilled off from the Ga—Mg melt under vacuum at a temperature of 1,5000° K., condensed to liquid Mg at a temperature of 950° K., and then discharged. The vacuum (0.006 bar) that was initially generated by means of a pump is remaining constant owing to the Mg vapour condensation.

The almost Mg-free Ga returns to the halide reduction chamber I.

In the oxidation chamber III GaCl is oxidised with air to give a fume of $Ga_2O_3$ dust and a mixture of $Cl_2$—$N_2$ at a temperature of 900° K.

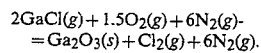

$$2GaCl(g)+1.5O_2(g)+6N_2(g)=Ga_2O_3(s)+Cl_2(g)+6N_2(g).$$

The $Ga_2O_3$ dust is separated from the $Cl_2$—$N_2$ mixture, the latter being separated into chlorine and nitrogen, and the two substances are removed from the process.

In the oxide reduction chamber IV the $Ga_2O_3$ dust is reduced with carbon to Ga at a temperature of 1,100° K., and CO is formed.

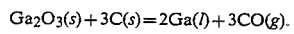

$$Ga_2O_3(s)+3C(s)=2Ga(l)+3CO(g).$$

The liquid Ga is returned to the reduction chamber I. The CO burned with air supplies heat for the process.

The GaCl vapour withdrawn from the halide reduction chamber I can also be converted to elemental Ga and $GaCl_3$ by increasing the pressure and/or cooling according to the principle of disproportionation of lower grade metal compounds (chamber V):

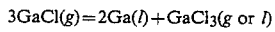

$$3GaCl(g)=2Ga(l)+GaCl_3(g \text{ or } l)$$

Ga is separated from $GaCl_3$ and returned to the halide reduction chamber I. The $GaCl_3$ can be decomposed electrolyticaly to Ga and chlorine or converted chemically to gallium and chlorine-containing products or oxidised with air or other oxygen-containing gases to give free chlorine and $Ga_2O_3$, which is then reduced with carbon or carbonaceous materials to elemental Ga.

Of course, the invention also permits mixtures of alkali and/or alkaline earth metals to be produced by common reduction of the respective halides, and suitable reducing agents and solvents are also mixtures of Ga, In, and Tl. Mixtures like these have the advantage that the dissolving power for the alkali and alkaline earth metals is increased.

For simplicity alkali and alkaline earth metals as well as mixtures thereof are referred to in the following as "metal" and Ga, In, and Tl as well as their mixtures as "reducing metal".

The process according to the invention is characterised in that (a) at least one halide is caused to react with gallium, indium, thallium or mixtures thereof as reducing metal in a reduction chamber at temperatures below the boiling point of the reducing metal and at a vapour pressure in the reduction chamber which is smaller than or at most equal to the reaction pressure to form the elemental metal and the monohalide of the reducing metal, and that the amount of reducing metal is chosen such that it is sufficient to reduce the halide and dissolve at least part of the amount of metal formed.

(b) the vapour formed in the reduction is separated from the metal-reducing metal melt and removed from the reduction chamber, and (c) the metal is distilled off from the metal-reducing metal melt in a fractionation chamber, removed from the process and condensed to the liquid or solid metal.

In this process the chemical conversion in the halide reduction chamber is improved by conducting the halide and the vapour formed due to the commencing reduction in countercurrent to the reducing metal.

The metal vapour distilled off in the fractionation chamber can be condensed by cooling in a condenser connected with the fractionation chamber to give liquid or solid metal, depending on the intended use of the metal, the low vapour pressure of the condensed metal being utilised to distill off the metal vapour in the fractionation chamber for generating a low pressure without energy being consumed.

Since the reducing metal monohalide escaping in the reduction may entrain part of the resulting metal in the form of metal vapour, the invention provides that the vapour leaving the halide reduction chamber is first cooled down to such an extent that the gaseous metal contained therein and an equivalent part of reducing metal monohalide are reconverted to the original solid or liquid metal halide and the liquid elemental reducing metal due to a reversal of the reduction reaction and that the rest of the reducing metal monohalide remains in the gaseous state; for example, the following reaction takes place upon cooling down from a reaction temperature of 1,400° K. to 500° K. (reaction pressure 0.14 bar):

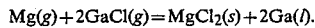

$$Mg(g) + 2GaCl(g) = MgCl_2(s) + 2Ga(l).$$

(In this context it should be noted that pure GaCl vapour is theoretically non-existent; in equivilibrium with the vapour are $GaCl_2$, $GaCl_3$, and the dimers $Ga_2Cl_2$, $Ga_2Cl_4$. Since GaCl predominates at small pressures far below 1 bar—even at a temperature of 400° K.—for simplicity the total unsaturated mixture is denoted as "monochloride", and more generally as "monohalide"; this applies analogously also to the unsaturated halide mixtures of In and Tl. The amounts of elemental reducing metal formed upon cooling of unsaturated halide mixtures of this type are correspondingly low at low pressures, so that they are being neglected. If it is intended, however, to obtain a major amount of elemental reducing metal by disproportionation of the monohalides, it is necessary to increase the pressure besides lowering the temperature.)

The liquid or solid metal halide and the liquid reducing metal are separated from the remaining gaseous reducing metal monohalide and returned to the halide reduction chamber; the gaseous reducing metal monohalide is cooled to turn liquid or solid and removed from the process. For a continuous process an equivalent amount of fresh elemental reducing metal would have to be admitted into the reduction zone.

More profitable, however, is the process according to the invention if the vapour leaving the reduction chamber is cooled and, after separating the condensed reducing metal and starting halide, the still gaseous reducing metal monohalide is oxidised with oxygen or oxygen-containing gases to give halogen and solid reducing metal oxide, the reducing metal oxide is separated and reduced with carbon or carbonaceous substances to give reducing metal which is recycled to the reduction chamber for the reduction of the halides.

When the metal halides are reduced a reaction pressure builds up in the halide reduction chamber. If the pressure of the vapour flowing from the halide reduction chamber (e.g. by flow resistances in the apparatus) is increased, the reduction reaction ceases for reasons of the law of nature. Hence, the process has to be conducted such that the vapour pressure in the halide reduction chamber is smaller or at most equal to the reaction pressure; it can easily be calculated thermodynamically and determined experimentally from known data. The required vapour pressure in the halide reduction chamber can be built up by sucking in the vapour and pressing it forward by means of blowers, pumps, and other conveyors.

Since the operation of such devices is an energy cost factor, advantage is taken of the known fact that the vapour pressure of condensed materials decreases with falling temperature. The vapour pressures of the solid and liquid halides are known; they can also easily be determined by experiment.

According to the invention, the gaseous reducing metal monohalide stripped off is cooled and condensed in condensers attached to the reduction chamber so that the vapour pressure of the liquid or solid condensates is by no means higher than the reaction pressure in the reduction chamber.

When reducing the reducing metal oxide impurities from the solid carbonaceous materials may be entrained in the reducing metal. Hence, from the solid carbon-containing materials used for the reduction, e.g. petroleum coke, coal coke, lignite coke and peat coke or charcoal all elements, with the exception of carbon are vaporized beforehand in the form of halides in a known manner—e.g. by treatment with halogens, hydrogen halides, and carbon tetrachloride at temperatures above 1,000° K.

If pure carbon or pure natural gas are used for the reduction of the reducing metal oxide, gases with a high calorific value which are rich in carbon monoxide or carbon oxide and hydrogen are obtained, in addition to the liquid elemental reducing metal.

Since heat is consumed in the reduction of the metal halide, when distilling off the metal from the resulting solution, and in the reduction of the reducing metal oxide and since, on the other hand, heat is set free in the condensation of the vapour from the metal-halide reduction, the condensation and oxidation of the reducing metal halide and in the condensation of the metal vapour distilled off from the solution of metal and reducing metal and also because the gases (CO, $H_2$) formed in the oxide reduction have a high calorific value, it is of great importance in order to improve the profitability of the process according to the invention to use the heat set free in the condensation and oxidation of the reducing metal halide, in the condensation of the metal vapour distilled off from the solution, and the heat liberated by combustion of the gases from the oxide reduction to cover at least part of the heat required for reducing the metal halide, distilling off the metal from the resulting solution and for the reduction of the reducing metal oxide.

An economically and technically optimum procedure according to the invention is the continuous performance of the reduction of the metal halides and the simultaneous solution of the metal formed in the halide reduction chamber in countercurrent to such an amount of reducing metal as is sufficient for dissolving the entire metal formed, the metal halide formed in the reduction chamber and the vapour formed because of commencing reduction first being contacted in countercurrent with liquid reducing metal from the fractionation chamber and thereafter with liquid reducing metal from the oxide reducing chamber; the metal from the reducing metal solution continuously discharged from the halide reduction chamber is continuously distilled off in the fractionation chamber, condensed to liquid or solid metal, and removed from the process, the almost metal-free liquid reducing metal from the fractionation chamber is admitted continuously into the halide reduction chamber, the gaseous reducing metal halide leaving the halide reduction chamber is continuously cooled, separated in solid or liquid form, and converted continuously with air in the oxidation chamber to give fume from solid reducing metal oxide and a gaseous halide-nitrogen mixture, the reducing metal oxide is continuously separated from the halogen-notrigen mixture, the halogen is separated from the nitrogen and these are removed from the process, the reducing metal oxide is continuously converted in the oxide reduction chamber with pure carbon to give liquid elemental reducing metal and carbon monoxide and continuously added to the halide reduction chamber and the heat set free in the condensation and oxidation of the reducing metal halide and by the continuous combustion of the carbon monoxide is used to cover at least part of the heat consumed by the process.

The countercurrent treatment in the halide reduction chamber can be effected by means of spraying, sprinkling via staggered pipes, and other process engineering measures.

The gaseous metals obtained according to the process covered by the invention can, for example, be cooled, condensed, and poured in liquid form into chill moulds. But they can also be converted to hydroxides, carbonates, hydrogen sulphites, phosphates, and other compounds. Of surprisingly high profitability is the use of the metals in gaseous, liquid or solid state for the reduction of metal halides (e.g. $TiCl_4$, $MnBr_2$, $ZrF_4$, $UI_4$, $WCl_5$, and $AlCl_3$) to metals (e.g. Ti, Mn, Zr, U, W, and Al), regeneration of the resulting alkali and alkaline earth metal halides to give elemental alkali and alkaline earth metals according to the invention and their recycling.

DETAILED DESCRIPTION OF THE INVENTION

EXAMPLE 1

Figure 1:
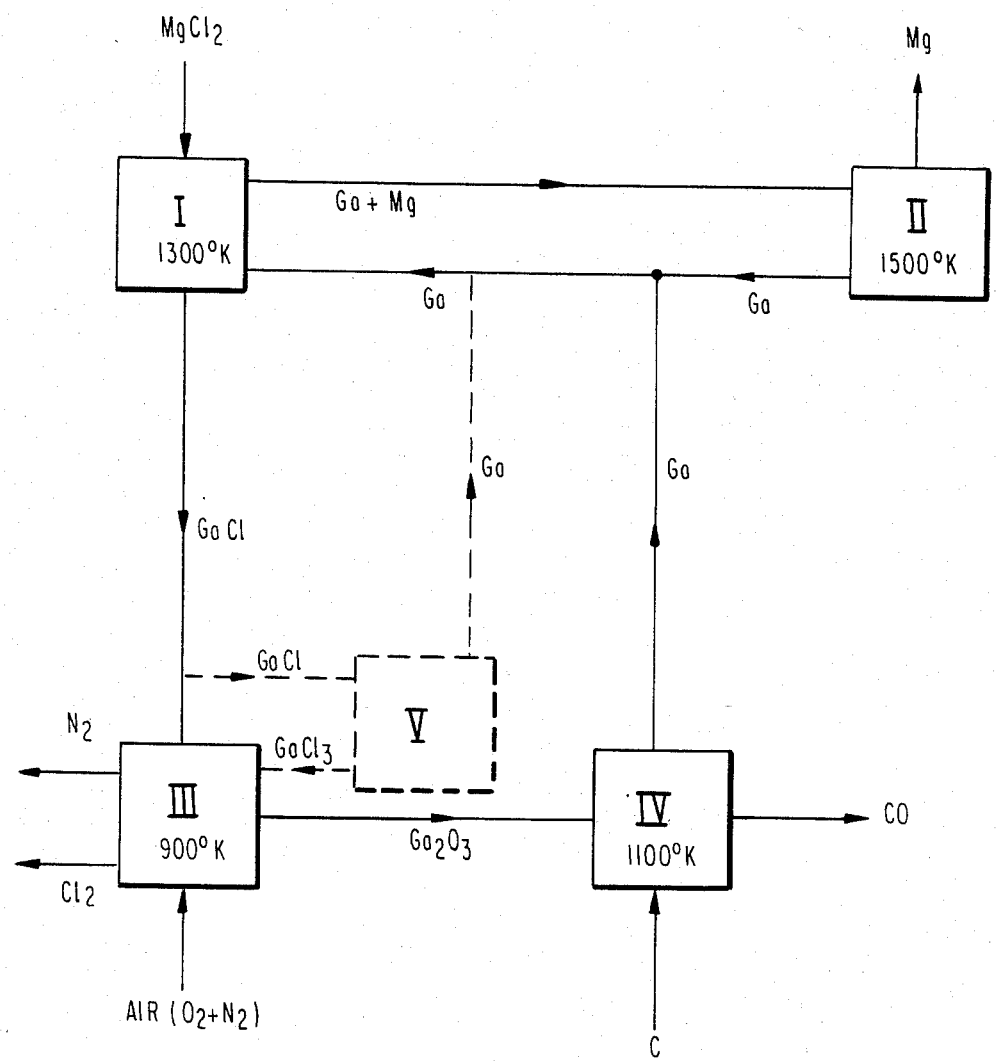
Figure 2:
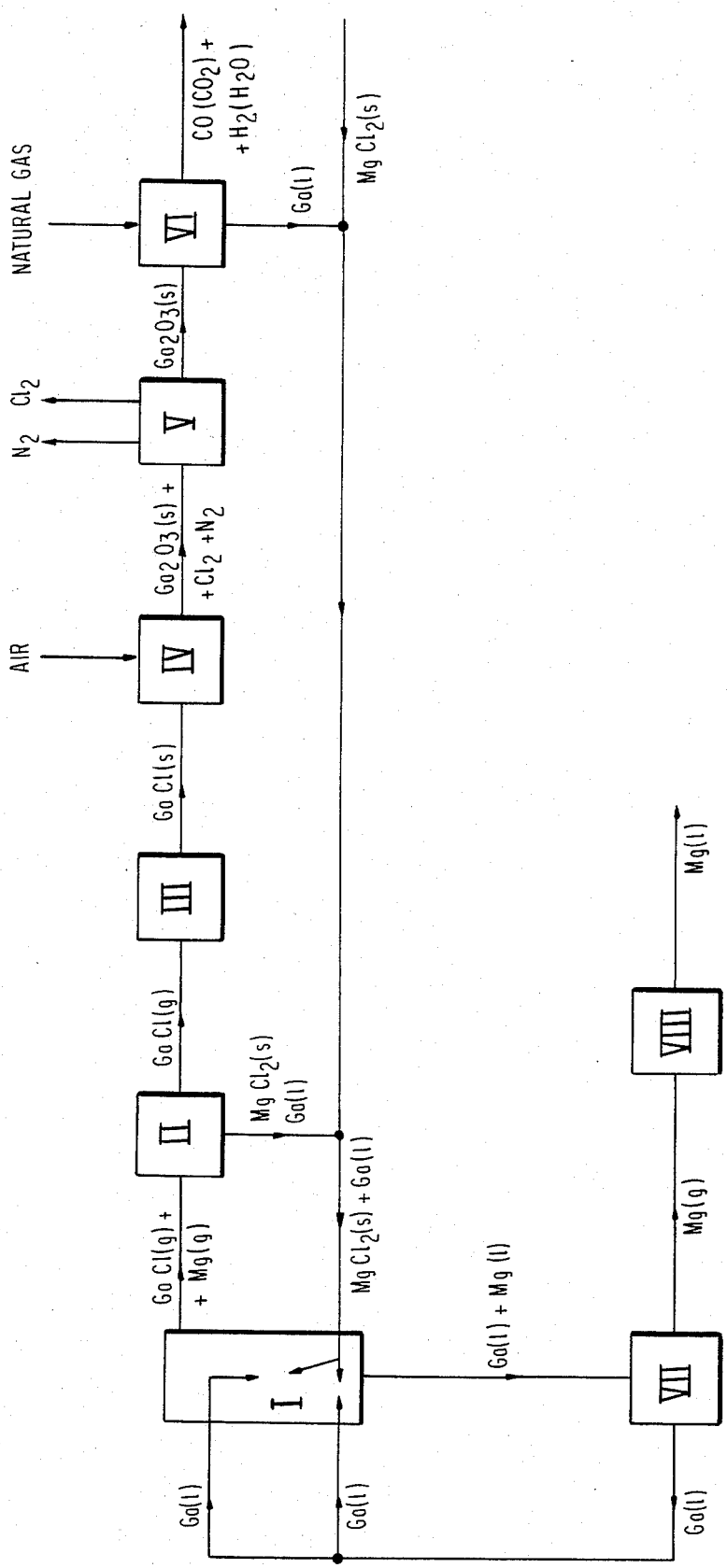

FIG. 2 shows a diagrammatic view of the course of the process for producing liquid magnesium by reduction of magnesium chloride with gallium. Gallium has a melting point of 303° K. (30° C.) and a boiling point of 2,478° K. (2,205° C.). The process is carried out continuously; the data below relate to the throughput of material per second.

10.3 kg solid $MgCl_2$ is added to the process. The $MgCl_2$ together with 15.1 kg Ga from the oxide reduction chamber VI and with 0.2 kg Ga as well as 0.1 kg solid $MgCl_2$ from condenser II is admitted to the front part of the halide reduction chamber I. Of the 62.2 kg of gallium from the fractionation chamber VII 52.7 kg Ga is caused to react with the $MgCl_2$ added in the front part of the halide reduction chamber I, and the balance of 9.5 kg Ga is introduced in the rear part of the halide reduction chamber I so that it moves in countercurrent to the $MgCl_2$ and the resulting vapour. Thus, a total amount of 77.5 kg Ga and an amount of 10.4 kg $MgCl_2$ are caused to react with each other.

The reduction temperature amounts to 900° K. and the reaction pressure is 0.02 torr. Two processes take place simultaneously in the halide reduction chamber I: the reduction of the $MgCl_2$ with an equivalent part of the gallium and the dissolving of the magnesium, in statu nascendi, in the residual amount of gallium.

Reduction:

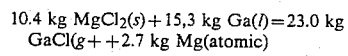
10.4 kg $MgCl_2(s)$+15,3 kg Ga$(l)$=23.0 kg GaCl$(g+$+2.7 kg Mg(atomic)

Solution:

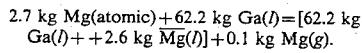
2.7 kg Mg(atomic)+62.2 kg Ga$(l)$=[62.2 kg Ga$(l)+$+2.6 kg $\overline{Mg}(l)$]+0.1 kg Mg$(g)$.

Since the amount of Ga is insufficient to dissolve the total amount of Mg formed, the GaCl vapour removes part of the Mg (0.1 kg) in the form of Mg vapour from the halide reduction chamber I.

The sum of reduction and solution in the halide reduction chamber I thus gives the following process:

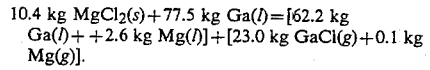
10.4 kg $MgCl_2(s)$+77.5 kg Ga$(l)$=[62.2 kg Ga$(l)+$+2.6 kg Mg$(l)$]+[23.0 kg GaCl$(g)$+0.1 kg Mg$(g)$].

The Ga—Mg solution is transported from the front part of the halide reduction chamber I into the fractionation chamber VII where it is heated to a temperature of 1,500° K. The Mg vapour (2.6 kg) escaping from the solution is forwarded into condenser VIII where it is cooled to a temperature of 940° K. and condensed to liquid Mg. At 940° K. liquid magnesium has a vapour pressure as low as 3.68 torr, so that almost all the magnesium is distilled off in the fractionation chamber VII from the solution heated at 1,500° K., and the low pressure generated at the beginning of the process by means of a vacuum pump then is maintained constantly owing to the condensation of Mg in the system VII-VIII. The amount of 2.6 kg liquid Mg is discharged from the condenser VIII and cast to pigs. The practically Mg-free gallium (62.2 kg) is returned to the halide reduction chamber I, as described before.

The vapour escaping from the halide reduction chamber I contains 23.0 kg GaCl and 0.1 kg Mg. It is cooled in the condenser II to 700° K. where by reversal of the reduction reaction part of the GaCl is reduced by Mg to give Ga:

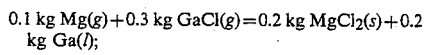
0.1 kg Mg$(g)$+0.3 kg GaCl$(g)$=0.2 kg $MgCl_2(s)$+0.2 kg Ga$(l)$;

hence, a residue of 22.7 kg GaCl vapour is left over in this process.

At 700° K. the vapour pressure of $MgCl_2(s)$ and Ga$(l)$ is practically zero. 0.2 kg $MgCl_2(s)$ and 0.2 kg Ga$(l)$ are returned from condenser II to the front part of the halide reduction chamber I, while the residual amount of 22.7 kg GaCl vapour flows into the condenser III where upon cooling to 400° K. it condenses to solid GaCl. Since the vapour pressure of solid gallium monochloride at 400° K. is as low as 0.002 torr and this pressure is permanently maintained because of the condensation of GaCl, the reduction reaction in the halide reduction chamber I takes place smoothly at a reaction pressure of 0.02 torr.

The solid GaCl (22.7 kg) is heated to 800° K. in a closed vessel (not visible in the Figure), whereupon it melts and generates a vapour pressure of 2.37 bar. The melt is burned with air in the combustion chamber IV at a temperature of 930° K., similar to fuel oil in an oil burner. The resulting fume consisting of solid $Ga_2O_3$, $Cl_2$, and $N_2$ arrives in the separating unit V.

In the separating unit V, $Ga_2O_3$ dust is removed from the gases, chlorine and nitrogen are separated and used as byproducts, whereas $N_2$ is discarded via the roof.

The $Ga_2O_3$ dust is reduced to gallium with natural gas at a temperature of 1,150° K. in the oxide reduction chamber VI to give high-grade fuel gas consisting of CO, $H_2$, and small proportions of $CO_2$ and $H_2O$. The gallium (15.1 kg) is returned to the front part of the halide reduction chamber I.

To cool the materials in the condensers II, III, and VIII as well as in the combustion chamber IV air is used as coolant, the air is heated in this process and used as combustion air for burning of the gas generated in the oxide reduction. The heat produced by combustion is used to cover the heat required in the halide reduction chamber I, for melting the solid GaCl discharged from the condenser III, in the oxide reduction chamber VI, and in the fractionation chamber VII.

EXAMPLE 2

Figure 3:
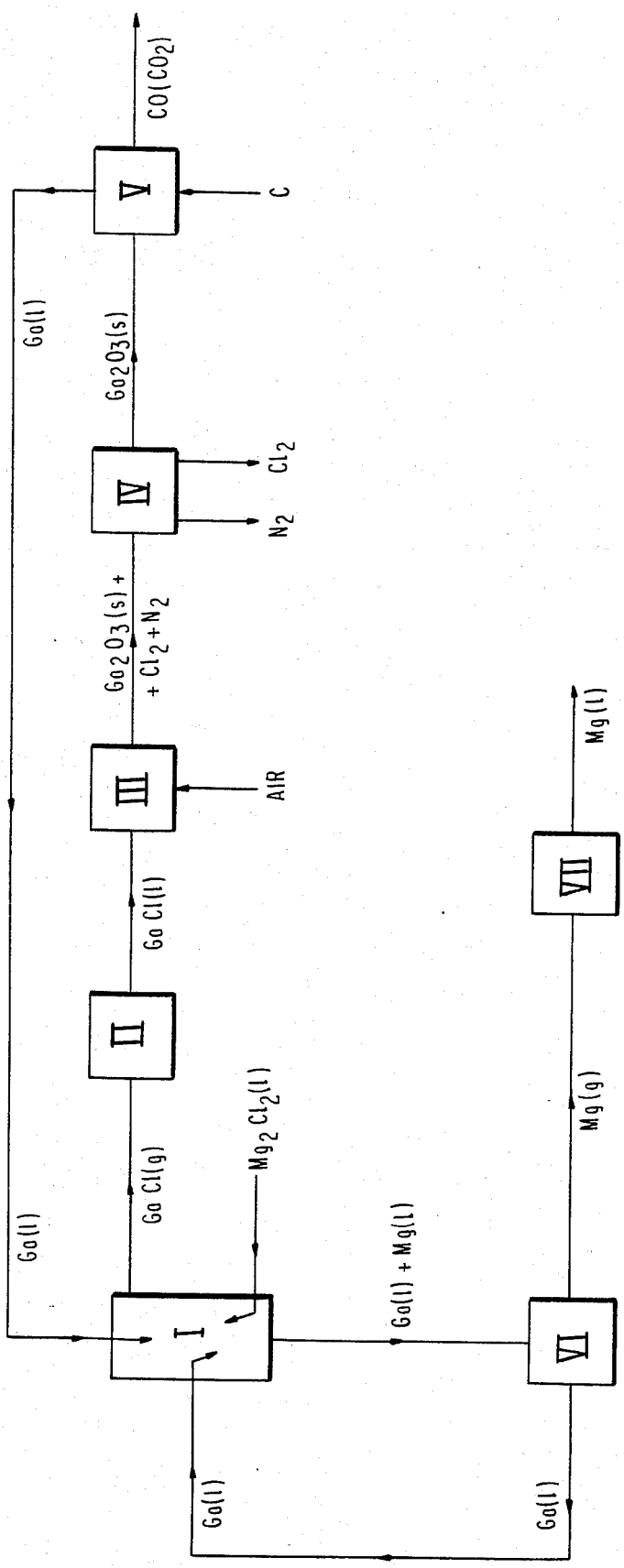

The schematic view of FIG. 3 shows the continuous production of magnesium, sufficient gallium being used both for the reduction of the $MgCl_2$ and for dissolving the total amount of Mg formed. Hence, the vapour escaping from the halide reduction chamber I consists only of pure gallium chloride.

As in Example 1, again 103 kg $MgCl_2$, however in molten state, is introduced into the front part of the halide reduction chamber I. The $MgCl_2(l)$ comes from a sealed vessel in which aluminium chloride ($AlCl_3$) is continuously reduced with Mg(l) at a temperature of 1,000° K. to give liquid aluminium. The almost Mg-free gallium (62.2 kg) leaving the fractionation chamber VI is introduced into the middle part and the completely Mg-free gallium (15.1 kg) leaving the oxide reduction chamber V into the rear part of the halide reduction chamber I.

At a reduction temperature of 1,500° K. on the one hand a liquid solution of 2.6 kg Mg in 62.2 kg gallium and on the other hand 22.7 kg pure GaCl vapour are formed. In the fractionation chamber VI the Mg (2.6 kg) is distilled off from the Ga—Mg solution at 1,500° K., condensed in the condenser VII at 950° K. to liquid Mg which is recycled for the reduction of aluminium chloride ($AlCl_3$) to liquid aluminium.

The reaction pressure built up in the halide reduction chamber I at a temperature of 1,500° K. amounts to 0.383 bar. To this pressure corresponds the vapour pressure of liquid GaCl at 694° K. Hence, the GaCl vapour escaping from the halide reduction chamber I is condensed in condenser II at a temperature of 690° K. to give liquid GaCl which at this temperature has a vapour pressure of 0.360 bar. It is burned with air in the combustion chamber III at a temperature of 900° K. to give a fume consisting of $Ga_2O_3(s)$, $Cl_2$, and $N_2$ which reaches the separator IV, where the $Ga_2O_3$ dust is removed from the gases, the chlorine is separated from nitrogen and used as by-product, whereas the nitrogen is discarded via the roof.

The $Ga_2O_3$ dust is reduced with purified petroleum coke at a temperature of 1,100° K. in the oxide reduction chamber V to give gallium (15.1 kg) whereby a high-grade fuel gas consisting of 99.8 volume percent CO and 0.2 volume percent $CO_2$ is formed. The gallium is returned to the rear part of the halide reduction chamber I.

The air from the condensers II and III as well as from the combustion chamber III used as coolant is burned with the gas taken from the oxide reduction chamber V and the resulting heat (high-heated flue gas) is transferred to the halide reduction chamber I, the oxide reduction chamber V, and the fractionation chamber VI.

EXAMPLE 2

Analogous to Example 2, sodium is obtained from sodium bromide treated with liquid indium as reducing metal and solvent at a temperature of 1,600° K. Indium has a melting point of 430° K. (157° C.) and a boiling point of 2,346° K. (2,073° C.).

According to the reaction equation:

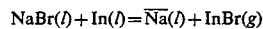
$$NaBr(l) + In(l) = \overline{Na}(l) + InBr(g)$$

the sodium bromide by liquid indium is reduced to sodium which is simultaneously dissolved in excess indium. The reaction pressure in the halide reduction chamber is 0.3 bar. The resulting In—Na solution contains 0.41 weight percent Na. The halide reduction chamber is cooled to a temperature of 1,200° K., initially by means of a vacuum pump generating a pressure of $10^{-6}$ torr, then the sodium is distilled off, and the escaping Na vapour is condensed to liquid sodium at a temperature of 373° K. After the distillation the indium contains traces of sodium that can only be detected by spectroscopic analysis.

The Na-free InBr vapour escaping from the halide reduction chamber is liquefied at 900° K. and burned with oxygen in a double-walled, water-cooled combustion chamber of copper sheet to give a fume consisting of $In_2O_3$ and $Cl_2$:

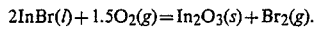
$$2InBr(l) + 1.5O_2(g) = In_2O_3(s) + Br_2(g).$$

The fume emerging from the combustion chamber is separated into $Br_2$ vapour and $In_2O_3$ dust using a porous alumina filter, and the bromine vapour is condensed by cooling to a temperature of 266° K. to give liquid bromine.

The $In_2O_3$ dust is mixed with pure carbon black, the mixture is pressed to pellets and heated to a temperature of 1,020° K. While a gas consisting of 99.7 volume percent CO and 0.3 volume percent $CO_2$ escapes, pure liquid indium is left:

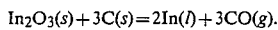
$$In_2O_3(s) + 3C(s) = 2In(l) + 3CO(g).$$

EXAMPLE 4

Potassium is obtained from potassium iodide using liquid thallium as reducing agent and solvent at a temperature of 1,600° K. Thallium has a melting point of 577° K. (304° C.) and a boiling point of 1,746° K. (1,473° C.).

According to the reaction equation

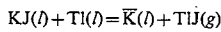
$$KJ(l) + Tl(l) = \overline{K}(l) + TlJ(g)$$

the potassium iodide by liquid thallium is reduced to potassium which is simultaneously dissolved in excess thallium. The reaction pressure in the halide reduction chamber amounts to 0.14 bar. The resulting Tl—K solution contains 0.3 weight percent K; the potassium is distilled off from the solution at 1,400° K. and a pressure of $10^{-4}$ torr, the corresponding condensation temperature for the K vapour amounting to 400° K.

The TlJ vapour leaving the halide reduction chamber is condensed to liquid TlJ at 745° K.

What is claimed is:

1. Process for producing alkali and alkaline earth metals as well as mixtures thereof by reducing their halides with reducing metals, comprising:
   (a) reacting as least one halide with gallium, indium, thallium or mixtures thereof as reducing metals in a reduction chamber at a temperature below the boiling point of the reducing metal and at a vapor pressure in the reduction chamber which is smaller or at most equal to the reaction pressure, while elemental metal and the monohalide of the reducing metal are formed, and the amount of reducing metal being so chosen that it is sufficient for reducing the halide and dissolving at least part of the amount of metal formed;
   (b) separating the vapor formed in the reduction from the metal-reducing metal melt and removing the vapor from the reduction chamber; and
   (c) distilling off the metal from the metal-reducing metal melt in a fractionation chamber, removing the metal from the process, and condensing the metal to provide liquid or solid metal.

2. Process as claimed in claim 1 wherein the halide and the vapor formed by the commencing reduction are conducted in countercurrent to the reducing metal.

3. Process as claimed in claim 1 or 2 wherein the vapor leaving the reduction chamber is cooled and, after separation of condensed reducing metal and initial halide, the still gaseous reducing metal monohalide is oxidized with oxygen or oxygen-containing gases to give halogen and solid reducing metal oxide, and the reducing metal oxide is separated and reduced with carbon or carbonaceous materials to give reducing metal which is again returned to the reduction chamber for the reduction of the halides.

4. Process as claimed in claim 3 wherein the gaseous reducing metal monohalide withdrawn from the reduction chamber is converted by cooling and/or increasing the pressure to give elemental reducing metal and reducing metal trihalide, the reducing metal being separated from the reducing metal trihalide and returned to the reduction chamber, the reducing metal trihalide being oxidized with oxygen-containing gases to give halogen and solid reducing metal oxide, the reducing metal oxide being separated and reduced with carbon or carbon-containing material to give reducing metal which in turn is recycled to the reduction chamber for the reduction of the halides.

5. Process as claimed in claim 3 wherein the gaseous reducing metal monohalide that has been removed is cooled and condensed in condensers connected with the reduction chamber so that the vapor pressure of the liquid or solid condensates does not exceed the reaction pressure built up in the reduction chamber.

6. Process as claimed in claim 1 wherein the gaseous reducing metal monohalide withdrawn from the reduction chamber is converted by cooling and/or increasing the pressure to give elemental reducing metal and reducing metal trihalide, the reducing metal being separated from the reducing metal trihalide and returned to the reduction chamber, the reducing metal trihalide being oxidized with oxygen-containing gases to give halogen and solid reducing metal oxide, the reducing metal oxide being separated and reduced with carbon or carbon-containing materials to give reducing metal which in turn is recycled to the reduction chamber for the reduction of the halides.

7. Process as claimed in claim 3 wherein the gaseous reducing metal monohalide that has been removed is cooled and condensed in condensers connected with the reduction chamber so that the vapor pressure of the liquid or solid condensates does not exceed the reaction pressure built up in the reduction chamber.

* * * * *